(12) United States Patent
Li et al.

(10) Patent No.: US 9,338,729 B2
(45) Date of Patent: May 10, 2016

(54) METHOD FOR DETECTING INTERFERENCE USER, HOME BASE STATION AND USER EQUIPMENT

(71) Applicant: FUJITSU LIMITED, Kawasaki-shi, Kanagawa (JP)

(72) Inventors: Hongchao Li, Beijing (CN); Yi Zhang, Beijing (CN); Yuantao Zhang, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 13/890,823

(22) Filed: May 9, 2013

(65) Prior Publication Data
US 2013/0242874 A1 Sep. 19, 2013

Related U.S. Application Data

(63) Continuation of application No. PCT/CN2010/078538, filed on Nov. 9, 2010.

(51) Int. Cl.
*H04B 7/216* (2006.01)
*H04M 3/42* (2006.01)
*H04W 48/10* (2009.01)
*H04W 84/04* (2009.01)
*H04W 74/08* (2009.01)

(52) U.S. Cl.
CPC .......... *H04W 48/10* (2013.01); *H04W 74/0833* (2013.01); *H04W 84/045* (2013.01)

(58) Field of Classification Search
USPC ........................................................ 370/328
See application file for complete search history.

(56) References Cited

U.S. PATENT DOCUMENTS

| 8,548,468 B2 | 10/2013 | Jin et al. |
| 8,666,077 B2 | 3/2014 | Patel et al. |
| 2009/0104905 A1* | 4/2009 | DiGirolamo et al. .......... 455/434 |
| 2010/0067466 A1 | 3/2010 | Isonuma et al. |

(Continued)

FOREIGN PATENT DOCUMENTS

| CN | 101835213 A | 9/2010 |
| CN | 101843148 A | 9/2010 |

(Continued)

OTHER PUBLICATIONS

Notice of Reason for Refusal issued for corresponding Japanese Patent Application No. 2013-538018, mailed on Dec. 2, 2014, with English Translation.

(Continued)

*Primary Examiner* — Edan Orgad
*Assistant Examiner* — Sithu Ko
(74) *Attorney, Agent, or Firm* — Myers Wolin, LLC

(57) ABSTRACT

Detecting interference user and home base station including: pre-configuring the cell type information of a home base station as an open cell type, and broadcasting the cell type information by the home base station in the cell; determining whether user equipment is one belonging to the home base station by the home base station according to the related information transmitted by the user equipment via a random access procedure, wherein the related information includes user information or a random access preamble; and determining by the home base station that the user equipment is an interference user, if the user equipment is not one belonging to the home base station.

7 Claims, 7 Drawing Sheets

(56) References Cited

U.S. PATENT DOCUMENTS

| | | |
|---|---|---|
| 2010/0067495 A1* | 3/2010 | Lee et al. .................. 370/335 |
| 2010/0173630 A1 | 7/2010 | Han et al. |
| 2010/0227611 A1* | 9/2010 | Schmidt et al. ............ 455/434 |
| 2010/0240349 A1* | 9/2010 | Jung et al. ................ 455/414.1 |
| 2010/0273448 A1 | 10/2010 | Iwamura et al. |

FOREIGN PATENT DOCUMENTS

| | | |
|---|---|---|
| EP | 1 594 336 A3 | 11/2005 |
| JP | 2007-536786 A | 12/2007 |
| JP | 2011-522493 A | 7/2011 |
| WO | 2009/136981 A1 | 11/2009 |
| WO | 2009/146725 A1 | 12/2009 |
| WO | 2010/098635 A2 | 2/2010 |
| WO | 2010/081696 A1 | 7/2010 |

OTHER PUBLICATIONS

Fujitsu, "Macro UE Initiated eICIC through CSG femto eNB", Agenda Item: 6.8.3, 3GPP TSG-RAN1 Meeting #62b, R1-105684, Xi'an, China, Oct. 11-15, 2010.

First Office Action and Search Report issued for corresponding Chinese Patent Application No. 201080068512.1, mailed Mar. 17, 2015, with an English translation.

Final Office Action issued by the Japan Patent Office for corresponding Japanese Patent Application No. 2013-538018, mailed on Apr. 28, 2015, with an English translation.

Notice of Reason for Rejection issued by the Japan Patent Office for corresponding Japanese Patent Application No. 2013-538018, mailed on Mar. 15, 2016, with an English translation.

* cited by examiner

METHOD FOR DETECTING INTERFERENCE USER, HOME BASE STATION AND USER EQUIPMENT

CROSS-REFERENCE TO RELATED APPLICATIONS

This application is based on the PCT Application No. PCT/CN2010/078538, filed Nov. 9, 2010, now pending, the entire contents of which are herein wholly incorporated by reference.

TECHNICAL FIELD

The present invention related to the field of wireless communication, and in particular to a method for detecting interference user, home base station and user equipment in a heterogeneous network.

BACKGROUND ART

A home NodeB (HNB), also referred to as a Femto Cell/Femto NodeB, or Pico Cell/Pico NodeB, etc., is a communication base station of extremely low transmission power for indoor scenarios, and usually provides wireless access services to home subscribers. The HNB extends indoor coverage of mobile signals at a relatively low cost, and satisfies the demands of subscribers for high-speed data traffics in an indoor scenario.

The subscriber access control mechanism of an HNB is different from that of a macro NodeB, a list of subscriber(s) allowed to access the HNB is preset by the subscriber of the HNB, in which identification information on the subscriber(s) allowed to access is recorded, and the identification information may uniquely identify one subscriber. The subscriber group(s) in the list of subscriber(s) constitute a closed subscriber group (CSG), and those subscribers not belonging to the CSG are not allowed to access the HNB.

As the random and uncertainty of the deployment of an HNB, interference inevitably exists between the HNB and a macro NodeB, such as a base station, a NodeB, and an eNodeB and between the HNBs.

FIG. 1 is a schematic diagram of deployment of a macro NodeB and an HNB. As shown in FIG. 1, an HNB and user equipment MUE accessing the macro NodeB are deployed at a boundary of a cell of the macro NodeB, for example, UE1 does not belong to a CSG of the HNB. When UE1 is located at the boundary of the cell of the macro NodeB, relatively high transmission power is often needed to be set for UE1, so as to maintain the communication with the macro NodeB. If the user equipment MUE and the home UE of the HNB occupy identical physical resources, the uplink transmission of the UE1 will bring relatively intense interference to the uplink receiving of the home UE, resulting in fall of throughput or degradation of quality of communication of the home UE, and blocking the home UE when the interference is severe; and at the same time, it is also possible that the downlink transmission of the HNB will cause the downlink of the UE1 cannot operate normally. That is, for a user not belonging to the CSG of the HNB, when the user is located at a boundary of a cell of its serving base station and near the HNB, the user is very possible to be subjected to relatively intense downlink interference of the HNB, and at the same time, the user may bring relatively intense uplink interference to the HNB. The user is herein referred to as an interference user of the HNB.

Currently, following manners are used to detect an interference user.

First, judging, by an HNB, whether there exists interference MUE by detecting an uplink signal of the UE and according to a predetermined threshold;

second, deciding, by a serving macro NodeB, an HNB bringing intense interference to MUE according to a report of measurement reported by the MUE, and then transmitting a result of measurement to a corresponding HNB via such backward link interfaces as X2/S2, so that the HNB learns that there exists interference MUE, and then decides whether to further trigger an interference suppression mechanism; and third, deciding, by a serving macro NodeB, an HNB bringing intense interference to MUE according to a report of measurement reported by the MUE, and then directly transmitting a triggering or recovering command (for which new signaling needs to be defined) to a corresponding HNB via such backward link interfaces as X2/S2, so that the HNB takes corresponding actions according to the signaling.

However, in the implementation herein, the inventors found that following defects exist in the prior art: if the first manner is used, the detection of performances by the HNB is related to a particular manner of implementation, resulting in difficulty in standardization; if the second and third manners are used, backward links are needed for interaction, which cannot be standardized at present; and these three manners do not satisfy the requirements on compatibility in Rel. 8/9.

SUMMARY

An object of certain embodiments to provide a method for detecting interference user, home base station and user equipment, in which the home base station is configured as an open cell type, and when the user equipment initiates a random access procedure to the home base station, the home base station may determine whether accessed user equipment is an interference user according to related information reported by the user equipment in the random access procedure, needing no use of backward link for interaction, and which may be standardized and with relatively better compatibility.

According to an aspect of the embodiments, there is provided a method for detecting interference user, comprising:

pre-configuring the cell type information of a home base station as an open cell type, and broadcasting the cell type information by the home base station in the cell;

determining whether user equipment is one belonging to the home base station by the home base station according to the related information transmitted by the user equipment via a random access procedure, wherein the related information includes user information or a random access preamble; and determining by the home base station that the user equipment is an interference user, if the user equipment is not one belonging to the home base station.

According to another aspect of the embodiments, there is provided a home base station, comprising:

a first configuring unit to pre-configure the cell type information of the home base station as an open cell type;

an information broadcasting unit to broadcast the configured cell type information in the cell;

a detecting unit to determine whether the user equipment is one belonging to the home base station according to the related information transmitted by the user equipment via a random access procedure, wherein the related information includes user information or a random access preamble; and an interference determining unit to determine that the user equipment is an interference user, if the detecting unit determines that the user equipment is not one belonging to the home base station.

According to a further aspect of the embodiments, there is provided a computer-readable program, wherein when the program is executed in a home base station, the program enables the computer to carry out the method for detecting interference user as described above in the home base station.

According to still another aspect of the embodiments, there is provided a storage medium in which a computer-readable program is stored, wherein the computer-readable program enables the computer to carry out the method for detecting interference user as described above in a home base station.

According to further still another aspect of the embodiments, there is provided user equipment, comprising:

a receiving unit to receive a configured cell type information broadcasted from a home base station to a cell; and a transmitting unit to transmit related information to the home base station via a random access procedure, the related information including user information or a random access preamble;

wherein the home base station determines whether the user equipment is one belonging to the home base station according to the related information, and determines that the user equipment is an interference user, if it is determined that the user equipment is not one belonging to the home base station.

The advantages of certain embodiments exist in that by configuring the home base station as an open cell type, when the user equipment initiates a random access procedure to the home base station, the home base station may determine whether accessed user equipment is an interference user according to related information reported by the user equipment in the random access procedure, needing no use of backward link for interaction, and which may be standardized and with relatively better compatibility.

Particular embodiments have been disclosed in detail with reference to the following description and drawings and are indicative of some of the ways in which the principles of certain embodiments may be employed, but it is understood that the claimed invention is not limited correspondingly in scope. Rather, the claimed invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION

The embodiments are described as follows with reference to the drawings. These embodiments are illustrative only, and are not intended to limit the claimed invention. For easy understanding of the principle and embodiments by those skilled in the art, the embodiments shall be described taking an enhanced long-term evolution advanced (LTE-A) system as an example. However, it should be understood that the claimed invention is not limited thereto, and is also applicable to a time-division duplexing (TDD) system, and a code-division multiple access (CDMA) system, etc.

Figure 1:
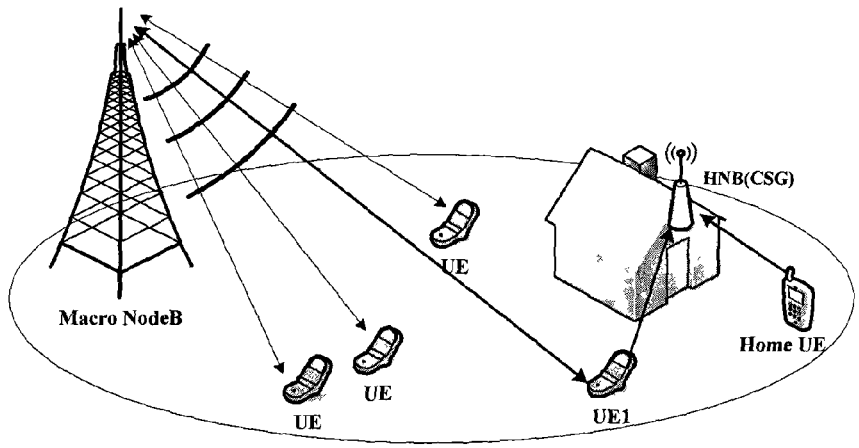
FIG. 1 is a schematic diagram of the deployment of a macro NodeB and a HNB.
Figure 2:
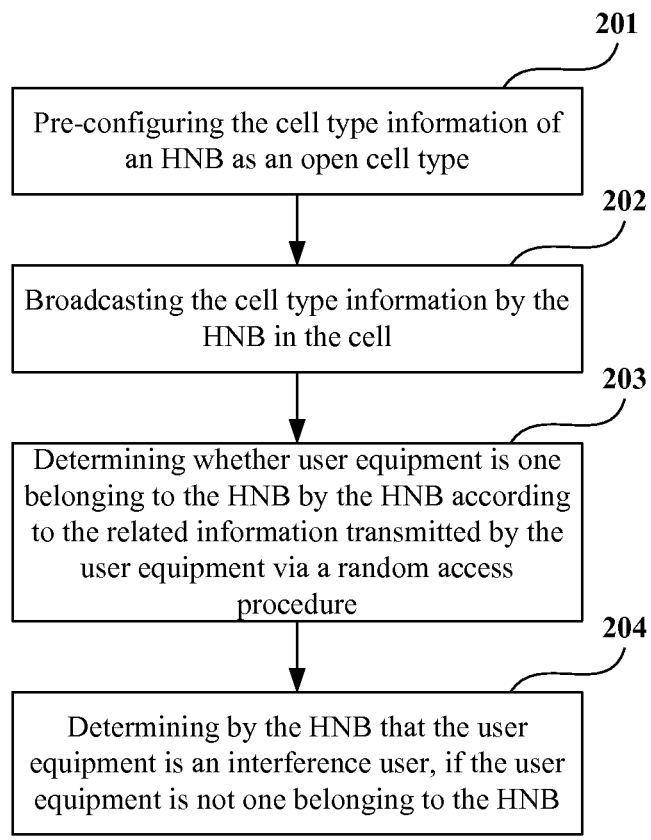
FIG. 2 is a flowchart of the method for detecting interference user in accordance with a first embodiment.

FIG. 2 is a flowchart of the method for detecting interference user in accordance with a first embodiment. As shown in FIG. 2, the method comprises:

step 201: pre-configuring the cell type information of an HNB as an open cell type;

step 202: broadcasting the cell type information by the HNB in the cell;

step 203: determining whether user equipment is one belonging to the HNB by the HNB according to the related information transmitted by the user equipment via a random access procedure, wherein the related information includes user information or a random access preamble; and step 204: determining by the HNB that the user equipment is an interference user, if the user equipment is not one belonging to the HNB.

It can be seen from the above embodiment that by changing an attribute of a closed HNB into a base station of an open type and transmitting the information by broadcasting, the user equipment is caused to consider that the HNB is a base station permitting access after the user equipment monitors the broadcast, and then initiates a random access procedure to the HNB. Therefore, the HNB may determine whether the user equipment is an interference user according to related information reported by the user equipment in the random access procedure.

Wherein, the interference user refers to other user equipment than that belonging to the HNB, which may be, for example, a macro NodeB, or may also be user equipment of other HNBs.

In this embodiment, the HNB may transmit the cell type information via open access signaling, such as Fake Open Access; wherein the item of csg-Indication may be set into an "open" state in the signaling, and the HNB may semi-statically configure a transmission cycle of transmission the signaling. Furthermore, other signaling may be used for transmitting the cell type information.

In this embodiment, when user equipment in an idle state or in a data connected state initiates a random access procedure to the HNB, in step 203, the HNB determines whether the user equipment is one belonging to the HNB according to the related information transmitted by the user equipment via a random access procedure, and following manner may be used: acquiring user information of the user equipment by the HNB according to an Msg3 of the random access procedure transmitted by the user equipment, wherein the user information includes identification information of the user; and determining that the user equipment is not one belonging to the HNB, if the user identification information does not belong to the identification information in a user list that is allowed by the HNB to be accessed; otherwise, determining that the user equipment is one belonging to the HNB.

In this embodiment, the method further comprises: configuring a random access preamble for detecting interference user in the HNB and other base stations covering the HNB, and prestoring in the other base stations identification of the HNB within the covering area of other base stations. In this embodiment, the other base stations include Macro base station and other home base stations.

In such a case, when the user equipment is in a data connected state, in step 203, in determining whether the user equipment is one belonging to the HNB by the HNB according to the related information transmitted by the user equipment via a random access procedure, the following manner may be used:

receiving by the HNB the random access preamble transmitted by the user equipment, and determining that the user equipment is not one belonging to the HNB, if the random access preamble is one for detecting interference user; wherein the random access preamble is that allocated to the user equipment by a base station to which the user equipment belongs according to the identification and quality and strength of the signal of a neighboring cell in the measurement report transmitted by the user equipment; and wherein when the identification of the neighboring cell is the identification of the HNB and the quality and strength of the signal are the best, the base station to which the user equipment belongs allocates a pre-configured random access preamble for detecting interference user to the user equipment.

In this embodiment, the identification of the HNB is available preserved closed subscriber group identification (CSG ID).

Furthermore, in this embodiment, after the HNB determines that the user equipment is an interference user, the method further comprises: triggering an interference coordination mechanism if the number of times of determining that the user equipment is an interference user within a predetermined time period or the number of interference users determined within a predetermined time period exceeds a first predetermined value.

After triggering an interference coordination mechanism, the method further comprises: adjusting or terminating the interference coordination mechanism if it is determined within a predetermined time period that there exists no interference user, or the number of times of determining that the user equipment is an interference user within a unit time period is less than a second predetermined value.

The method for detecting interference user of the embodiments shall be described below in detail with reference to FIGS. 3 and 4 taking that user equipment in an idle state and in a data connected state initiates a random access procedure to a HNB in an LTE system as an example.

Figure 3:
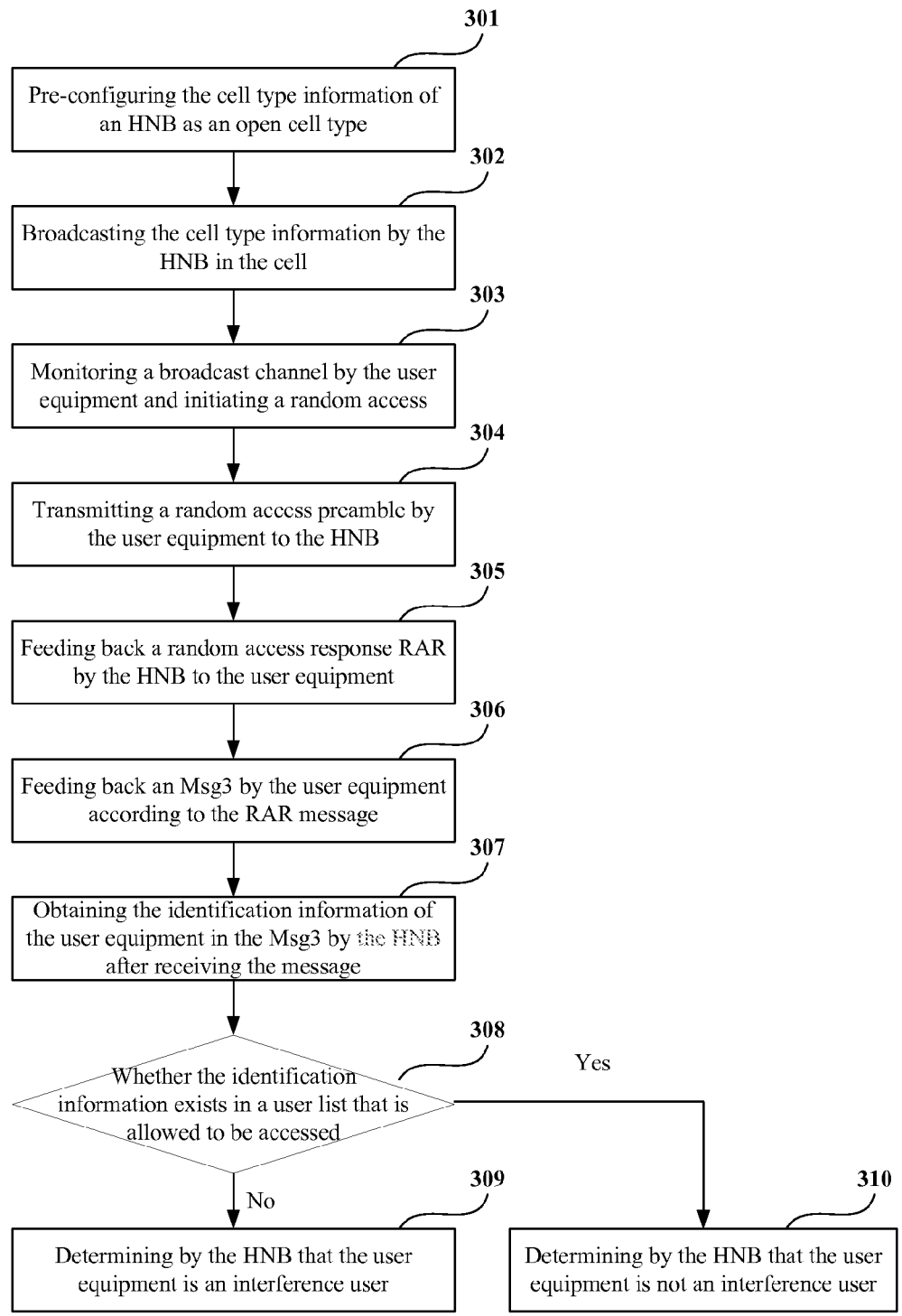
FIG. 3 is a flowchart of the method for detecting interference user in accordance with a second embodiment.

FIG. 3 is a flowchart of the method for detecting interference user in accordance with a second embodiment. Wherein, the user equipment is in an idle state, and the HNB determines whether the user equipment is an interference user according to an Msg3 message in a random access procedure reported by the user equipment.

As shown in FIG. 3, the method comprises:

step 301: pre-configuring the cell type information of an HNB as an open cell type;

wherein "csg-Indication" in the "Fake Open Access" signaling may be set into an "open" state;

step 302: broadcasting the cell type information by the HNB in the cell;

wherein the cell type information may be transmitted by transmitting the "Fake Open Access" signaling; and wherein a transmission period of transmitting the signaling may be semi-statically configured;

furthermore, the HNB starts counters and timers for detecting interference user;

step 303: monitoring a broadcast channel by the user equipment in the idle state, and if the broadcast is received and it is measured that the signals of the HNB are intense enough, initiating a cell reselection procedure by the user equipment, so as to initiate a random access to the HNB;

the following steps 304-307 are for the random access procedure, and are similar to those in the prior art, which shall be described herein in brief;

step 304: transmitting a random access preamble by the user equipment to the HNB;

step 305: receiving the random access preamble by the HNB, and transmitting a random access response (RAR) message;

wherein the RAR message may contain a detected index of the random access preamble, time adjustment information for uplink synchronization, initial uplink resource allocation (the user equipment transmits subsequent Msg3), and a cell radio network temporary identifier (C-RNTI);

step 306: obtaining uplink time synchronization and uplink resources by the user equipment after receiving the RAR message; however, as whether the RAR message is transmitted to the user equipment or other user equipment at this time cannot be determined, the user equipment transmits the Msg3 message to the HNB, so as to eliminate the above random access conflict;

wherein, identification information of the user equipment is carried in the Msg3 message, so as to distinguish different pieces of user equipment;

step 307: obtaining the identification information of the user equipment carried in the Msg3 message by the HNB after receiving the Msg3 message;

step 308: judging whether the identification information of the user equipment exists in a user list that is allowed by the HNB to be accessed, and if the result of judgment is negative, executing step 309; otherwise, executing step 310;

step 309: determining by the HNB that the user equipment is an interference user if the result of judgment in step 308 is that the identification information of the user equipment does not exist in the user list; wherein the base station to which the interference user belongs may be a macro NodeB or other HNBs; and step 310: determining by the HNB that the user equipment is not an interference user if the result of judgment in step 308 is that the identification information of the user equipment exists in the user list.

It can be seen from the above embodiment that by changing an attribute of a closed HNB into a base station of an open type and transmitting the information by broadcasting, the user equipment in an idle state is caused to consider that the HNB is a base station permitting access after the user equipment monitors the broadcast, and then initiates a random access procedure to the HNB. Therefore, the HNB may determine whether the user equipment is an interference user according to the user identification information reported by the user equipment in the Msg3 of the random access procedure.

Figure 4:
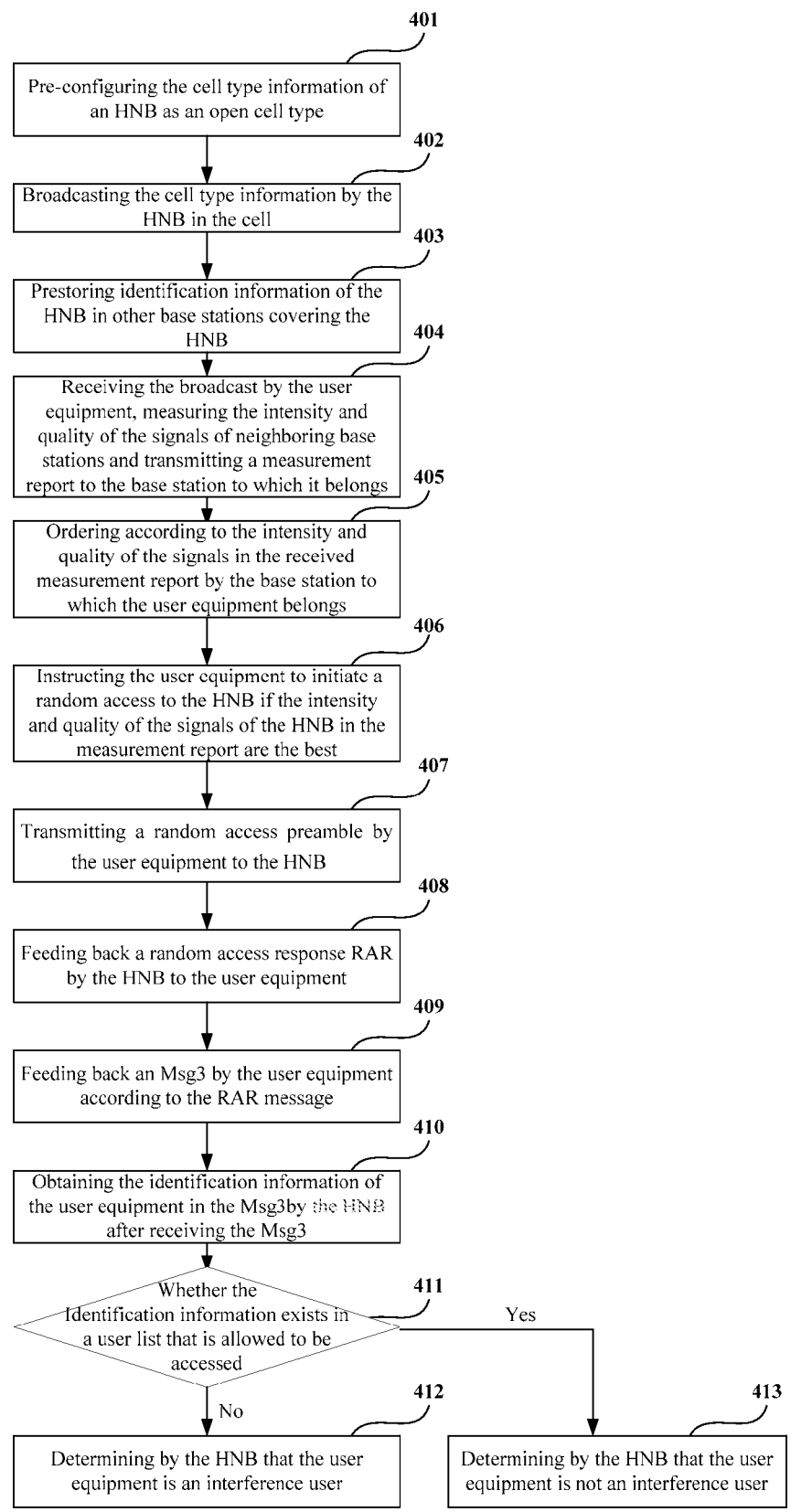
FIG. 4 is a flowchart of the method for detecting interference user in accordance with a third embodiment.

FIG. 4 is a flowchart of the method for detecting interference user in accordance with a third embodiment. Wherein, the user equipment is in a data connected state, and the HNB determines whether the user equipment is an interference user according to an Msg3 message in a random access procedure reported by the user equipment.

As shown in FIG. 4, the method comprises:

step 401: pre-configuring the cell type information of a HNB as an open cell type;

wherein "csg-Indication" in the "Fake Open Access" signaling may be set into an "open" state;

step 402: broadcasting the cell type information by the HNB in the cell;

wherein the cell type information may be transmitted by transmitting the "Fake Open Access" signaling; and wherein a transmission period of transmitting the signaling may be semi-statically configured;

furthermore, the HNB starts counters and timers for detecting interference user;

step 403: prestoring identification information of the HNB in other base stations covering the HNB, such as a macro NodeB, or other HNBs;

wherein the identification information of the HNB may be physical layer cell identification (PhysCell ID), or cell global identification (CGI ID); furthermore, the identification information of the HNB may also be preserved closed subscriber group identification (CSG ID);

the above steps 401-403 may be executed in an arbitrary order, and the above process is just an embodiment;

step 404: when the user equipment is in the data connected state, at this time, an E-UTRAN controls a handover procedure of the cell, and the user equipment will receive the broadcast and measure the intensity and quality of the signals of neighboring base stations including the HNB, and transmitting a measurement report by the user equipment to the base station to which it belongs;

wherein the measurement report comprises identification information of the base stations and the intensity and quality of the signals of them;

step 405: ordering according to the intensity and quality of the signals in the report of measurement by the base station to which the user equipment belongs after receiving the report of measurement;

step 406: determining that a handover procedure needs to be initiated, instructing the user equipment to initiate a random access to the HNB, if the intensity and quality of the signals of the HNB in the measurement report are the best;

the procedures of steps 407-413 are similar to those of steps 304-310 in the second embodiment shown in FIG. 3, which shall not be described any further.

It can be seen from the above embodiment that by changing an attribute of a closed HNB into a base station of an open type and transmitting the information by broadcasting, and furthermore, by prestoring the identification information of the HNB in other base stations covering the HNB, such as a macro NodeB or other HNBs, the user equipment in a data connected state receives the broadcast, measure the intensity and quality of the signals of neighboring base stations including the HNB, and report the measurement report to the base station to which the user equipment belongs; and after ordering according to the intensity and quality of the signals in the measurement report by the base station to which the user equipment belongs, if the intensity and quality of the signals of the HNB are the best, it may be determined that a handover procedure needs to be initiated, instructing the user equipment to initiate a random access procedure to the HNB. Therefore, the HNB may determine whether the user equipment is an interference user according to the user identification information reported by the user equipment in an Msg3 of the random access procedure.

Figure 5:
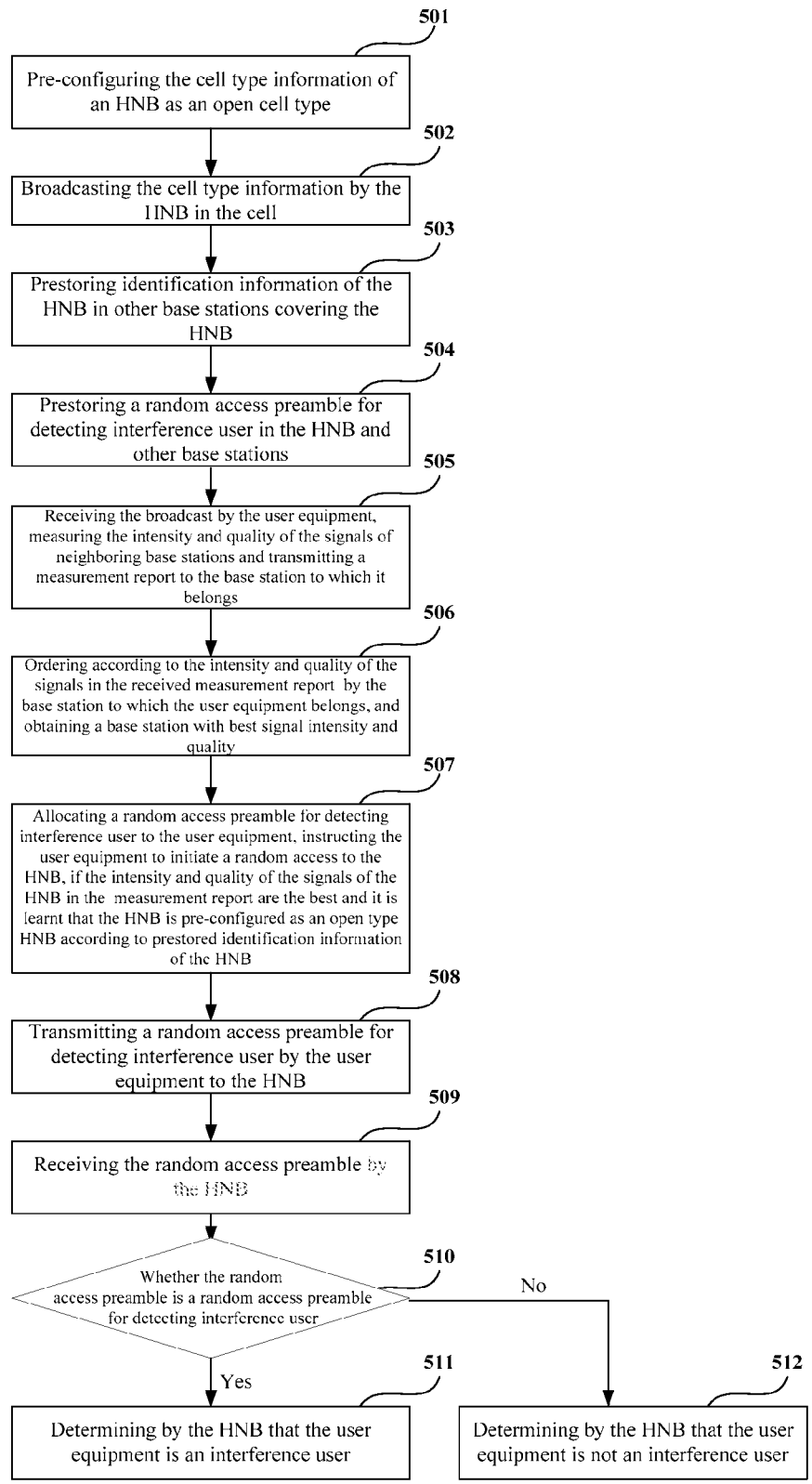
FIG. 5 is a flowchart of the method for detecting interference user in accordance with a fourth embodiment.

FIG. 5 is a flowchart of the method for detecting interference user in accordance with a fourth embodiment. Wherein, the user equipment is in a data connected state, and the HNB determines whether the user equipment is an interference user according to a random access preamble in a random access procedure reported by the user equipment.

As shown in FIG. 5, the method comprises:

step 501: pre-configuring the cell type information of a HNB as an open cell type;

wherein "csg-Indication" in the "Fake Open Access" signaling may be set into an "open" state;

step 502: broadcasting the cell type information by the HNB in the cell;

wherein the cell type information may be transmitted by transmitting the "Fake Open Access" signaling; and wherein a transmission period of transmitting the signaling may be semi-statically configured;

furthermore, the HNB starts counters and timers for detecting interference user;

step 503: prestoring identification information of the HNB in other base stations covering the HNB, such as a macro NodeB, or other HNBs;

wherein the identification information of the HNB may be physical layer cell identification (PhysCell ID), or cell global identification (CGI ID); furthermore, the identification information of the HNB may also be preserved closed subscriber group identification (CSG ID);

step 504: prestoring a random access preamble for detecting interference user in the HNB and other base stations covering the HNB, such as a macro NodeB and other HNBs; wherein the random access preamble is a preserved random access preamble for detecting interference user;

the above steps 501-504 may be executed in an arbitrary order, and the above process is just an embodiment;

step 505: when the user equipment is in the data connected state, at this time, an E-UTRAN controls a handover procedure of the cell, and in such a case, the user equipment will receive the broadcast and measure the intensity and quality of the signals of neighboring base stations including the HNB, and transmitting a measurement report by the user equipment to the base station to which it belongs;

wherein the measurement report comprises identification information of the base stations and the intensity and quality of the signals of them;

step 506: ordering according to the intensity and quality of the signals in the report of measurement by the base station to which the user equipment belongs after receiving the report of measurement, and determining a base station with best signal intensity and quality;

step 507: allocating a random access preamble for detecting interference user to the user equipment by the base station to which the user equipment belongs, instructing the user equipment to initiate a random access to the HNB, if the intensity and quality of the signals of the HNB in the measurement report are the best and it is learnt that the HNB is pre-configured as an open type HNB according to prestored identification information of the HNB;

step 508: transmitting a random access preamble for detecting interference user by the user equipment to the HNB;

step 509: receiving, by the HNB, the random access preamble transmitted by the user equipment;

step 510: judging whether the received random access preamble is a random access preamble for detecting interference user according to the preserved random access preamble for detecting interference user;

step 511: determining by the HNB that the user equipment is an interference user if the result of judgment in step 510 is positive; and step 512: determining by the HNB that the user equipment is not an interference user if the result of judgment in step 510 is negative.

It can be seen from the above embodiment that by changing an attribute of a closed HNB into a base station of an open type and transmitting the information by broadcasting, and furthermore, by prestoring the identification information of the HNB in other base stations covering the HNB, such as a macro NodeB or other HNBs, and pre-configuring a random access preamble for detecting interference user, the user equipment in a data connected state is caused to receive the broadcast, measure the intensity and quality of the signals of neighboring base stations including the HNB, and report the measurement report to the base station to which the user equipment belongs; and after ordering according to the intensity and quality of the signals in the measurement report by the base station to which the user equipment belongs, if the intensity and quality of the signals of the HNB are the best, it may be determined that a handover procedure needs to be initiated, and the HNB is an HNB pre-configured as an open type, the user equipment is instructed to initiate a random access procedure to the HNB, and a pre-configured random access preamble for detecting interference user is allocated. Therefore, the HNB may determine whether the user equipment is an interference user according to the random access preamble reported by the user equipment in the random access procedure.

It can be seen from above that an interference user may be detected at the HNB in the method as described above, with the method being relatively better in compatibility and needing no backward link.

Furthermore, in this embodiment, when it is detected that the user equipment is user equipment out of the region to which the HNB belongs, the method further comprises:

accumulating counters, and then repeating the above flows for further detection; if the number of times of determining that the user equipment is an interference user within a predetermined time period by the HNB or the number of interference users determined within a predetermined time period exceeds a predetermined value, an interference coordination mechanism may be triggered.

Wherein, the interference coordination may use such manners as power control, a time domain scheme (muting, symbol-level timing offset, and subframe-level timing offset, etc.), and frequency domain staggering, etc., which are similar to the prior art, and shall not be described any further.

After the HNB triggers the interference coordination mechanism, the method further comprises:

reconfiguring the HNB with a transmission period of open access signaling;

proceeding with collection of related information of the interference user by the HNB, and using the counters and timers for counting;

adjusting or terminating the interference coordination mechanism if the HNB determines in the predetermined time period that no interference user is found or the number of times of counting the interference users in a unit time is less than a predetermined value;

performing interference coordination and proceeding with counting if the number of times of counting the interference users by the HNB in the predetermined time period is still greater than the predetermined value.

It can be seen from the above embodiment that by changing an attribute of a closed HNB into a base station of an open type and transmitting the information by broadcasting, and furthermore, by prestoring the identification information of the HNB in other base stations covering the HNB, such as a macro NodeB or other HNBs, and pre-configuring a random access preamble for detecting interference user, the user equipment is caused to perform random access according to the broadcast massage, and the HNB may determine whether the user equipment is an interference user according to the Msg3 reported in the random access procedure; furthermore, when the user equipment is in a data connected state, preserved random access preambles for detecting interference user may be allocated to the HNB. Therefore, the HNB may determine whether the user equipment is an interference user according to the random access preamble reported by the user equipment in the random access procedure. The method is relatively better in compatibility and needs no backward link.

It should be understood by those skilled in the art that all or part of the steps in the methods of the above embodiments may be implemented by related hardware instructed by a program, and the program may be stored in a computer-readable storage medium. In executing the program, all or part of the steps in the methods of the above embodiments may be included, and the storage medium may comprise an ROM, an RAM, a floppy disk, and a compact disk, etc.

An embodiment provides also a HNB as described above. As the principles of the HNB for solving problems are similar to those of the method for detecting interference user based on a HNB as described above, the implementation of the method may be referred to for the implementation of the HNB, and the repeated parts shall not be described further.

Figure 6:
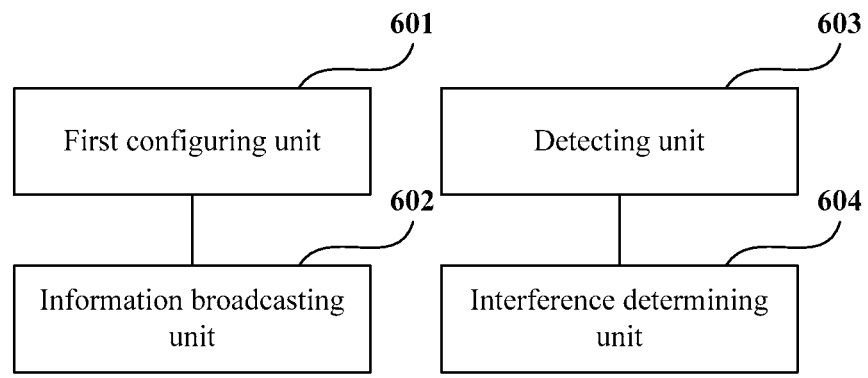
FIG. 6 is a schematic diagram of the structure of the HNB in accordance with a fifth embodiment.

FIG. 6 is a schematic diagram of the structure of the HNB in accordance with a fifth embodiment. As shown in FIG. 6, the HNB comprises: a first configuring unit 601, an information broadcasting unit 602, a detecting unit 603 and an interference determining unit 604; wherein, the first configuring unit 601 is configured to pre-configure the cell type information of the HNB as an open cell type;

the information broadcasting unit 602 is configured to broadcast the configured cell type information in the cell;

the detecting unit 603 is configured to determine whether the user equipment is one belonging to the HNB according to the related information transmitted by the user equipment via a random access procedure, wherein the related information includes user information or a random access preamble; and the interference determining unit 604 is configured to determine that the user equipment is an interference user, if the detecting unit 603 determines that the user equipment is not one belonging to the HNB.

In the above embodiment, the manner of the first configuring unit 601 for configuring the open cell type and the manner of the information broadcasting unit 602 for broadcasting the cell type information are as described in the first to fourth embodiments, which shall not be described any further.

In this embodiment, the detecting unit 603 may determine whether the user equipment is one belonging to the HNB according to the user information in the Msg3 transmitted by the user equipment in the random access procedure or a random access preamble transmitted by the user equipment in the random access procedure, the detailed process of detection is as described in the first to fourth embodiments, which shall not be described any further.

Figure 7:
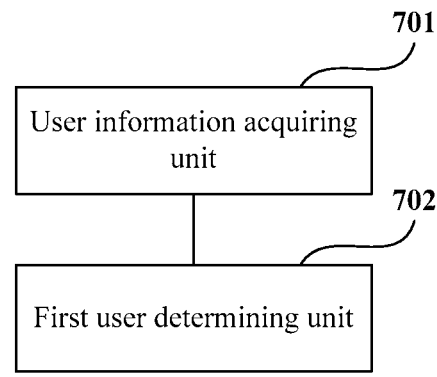
FIG. 7 is a schematic diagram of the structure of the detecting unit in accordance with the fifth embodiment.

FIG. 7 is a schematic diagram of the structure of the detecting unit 603 in accordance with the fifth embodiment. As shown in FIG. 7, the detecting unit 603 comprises:

a user information acquiring unit 701 configured to acquire user information of the user equipment according to an Msg3 message transmitted by the user equipment during the random access procedure, wherein the user information includes identification information of the user; and a first user determining unit 702 configured to determine that the user equipment is not one belonging to the HNB, if the user identification information acquired by the user information acquiring unit 701 does not belong to the identification information in a user list that is allowed by the HNB to be accessed.

The above HNB is applicable to user equipment in an idle state or in a data connected state.

Figure 8:
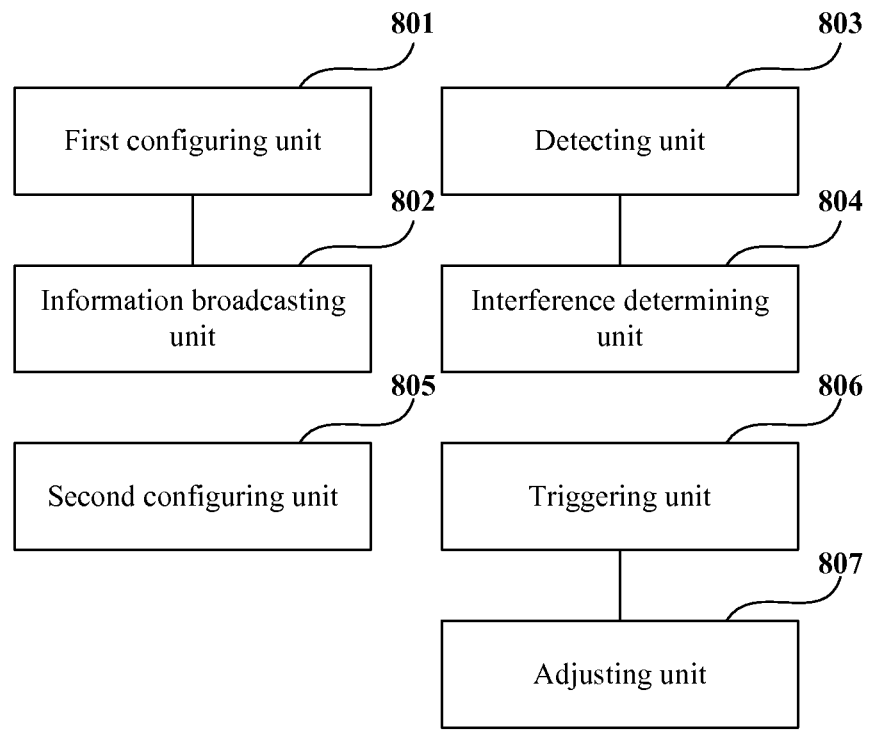
FIG. 8 is a schematic diagram of the structure of the HNB in accordance with a sixth embodiment.
Figure 9:
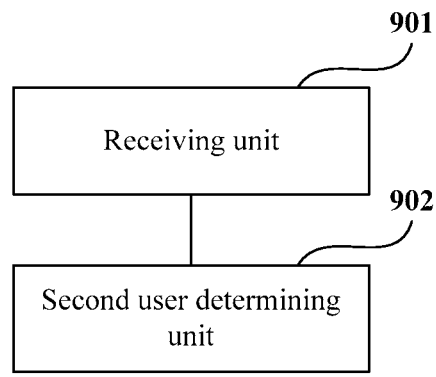
FIG. 9 is a schematic diagram of the structure of the detecting unit in accordance with the sixth embodiment.

FIG. 8 is a schematic diagram of the structure of the HNB in accordance with the sixth embodiment. As shown in FIG. 8, the HNB comprises: a first configuring unit 801, an information broadcasting unit 802, a detecting unit 803 and an interference determining unit 804, with the functions of them being similar to those in the fifth embodiment, which shall not be described any further.

Furthermore, as shown in FIG. 8, the HNB comprises:

a second configuring unit 805 configured to configure a random access preamble for detecting interference user in the HNB.

When the user equipment is in a data connected state, the detecting unit 803 comprises:

a receiving unit 901 configured to receive the random access preamble transmitted by the user equipment, the random access preamble being that allocated to the user equipment by a base station to which the user equipment belongs according to the identification and quality and strength of the signal of an neighboring cell in the measurement report transmitted by the user equipment; wherein when the identification of the neighboring cell is the identification of the HNB and the quality and strength of the signal are the best, the base station to which the user equipment belongs allocates a pre-configured random access preamble for detecting interference user to the user equipment; and a second user determining unit 902 configured to determine that the user equipment is not one belonging to the HNB, if the random access preamble received by the receiving unit 901 is the random access preamble for detecting interference user; wherein the received random access preamble may be compared with a predetermined random access preamble for detecting interference user, and it may be determined that the user equipment is not one belonging to the HNB, if the received random access preamble is the random access preamble for detecting interference user As shown in FIG. 8, the HNB further comprises:

a triggering unit 806 configured to trigger an interference coordination mechanism if the number of times of determining that the user equipment is an interference user within a predetermined time period or the number of interference users determined within a predetermined time period exceeds a first predetermined value.

As shown in FIG. 8, the HNB further comprises:

an adjusting unit 807 configured to, after the triggering unit 806 triggers the interference coordination mechanism, adjust or terminate the interference coordination mechanism if it is determined within a predetermined time period that there exists no interference user, or the number of times of determining that the user equipment is an interference user within a unit time period is less than a second predetermined value.

Furthermore, the HNB comprises a storing unit (not shown) configured to store predetermined random access preambles.

Figure 10:
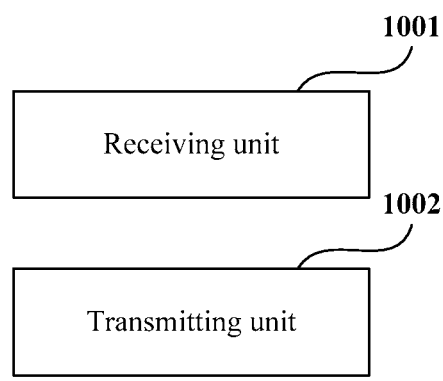
FIG. 10 is a schematic diagram of the structure of the user equipment in accordance with a seventh embodiment.

FIG. 10 is a schematic diagram of the structure of the user equipment in accordance with a seventh embodiment. As shown in FIG. 10, the user equipment comprises:

a receiving unit 1001 configured to receive configured cell type information broadcasted from a HNB in a cell; and a transmitting unit 1002 configured to transmit related information to the HNB via a random access procedure, the related information including user information or a random access preamble;

wherein the HNB determines whether the user equipment is one belonging to the HNB according to the related information, and determines that the user equipment is an interference user, if it is determined that the user equipment is not one belonging to the HNB; and the detailed method for determining is as described in the above embodiments, which shall not be described any further.

In this embodiment, when the user equipment is in the idle state or in the data connected state, the transmitting unit 1002 may transmit to the HNB a message including the user information, such as an Msg3 message; furthermore, when the user equipment is in the data connected state, the transmitting unit 1002 may also transmit the random access preamble to the HNB.

An embodiment provides also a computer-readable program, wherein when the program is executed in an HNB, the program enables the computer to carry out the method for detecting interference user as described in the first to fourth embodiments in the HNB.

An embodiment provides also a storage medium in which a computer-readable program is stored, wherein the computer-readable program enables the computer to carry out the method for detecting interference user as described in the first to fourth embodiments in an HNB.

It can be seen from the above embodiment that by changing an attribute of a closed HNB into a base station of an open type and transmitting the information by broadcasting, and furthermore, by prestoring the identification information of the HNB in other base stations covering the HNB, such as a macro NodeB or other HNBs, and pre-configuring a random access preamble for detecting interference user, the user equipment is caused to perform random access according to the broadcast massage, and the HNB may determine whether the user equipment is an interference user according to the Msg3 reported in the random access procedure; furthermore, when the user equipment is in a data connected state, pre-served random access preambles for detecting interference user may be allocated to the HNB. Therefore, the HNB may determine whether the user equipment is an interference user according to the random access preamble reported by the user equipment in the random access procedure. The method is relatively better in compatibility and needs no backward link.

The above devices and methods may be implemented by hardware, and may also be implemented by hardware in combination with software. Certain embodiments relate to such a computer-readable program that when the program is executed by a logic component, it enables the logic component to implement the devices or constitutional parts as described above, or enables the logic component to implement the methods or steps as described above. Certain embodiments relate also to a storage medium for storing the above program, such as a hard disk, a floppy disk, a CD, and flash memory, etc.

Certain embodiments are described above in conjunction with the embodiments that may be claimed, however, it will be apparent to those skilled in the art that such description is exemplary only and is not limitative to the protection scope of the claimed invention. Various variations and modifications may be made by those skilled in the art without departing from the spirits and principles herein, which will fall within the protection scope of the claimed invention.

The invention claimed is:

1. A method for detecting an interference user, wherein the method comprises:
   pre-configuring a cell type information of a home base station as an open cell type, and broadcasting the cell type information by the home base station in the cell;
   determining whether user equipment is one belonging to the home base station by the home base station according to related information transmitted by the user equipment via a random access procedure, wherein the related information includes a random access preamble; and
   determining by the home base station that the user equipment is an interference user, if the user equipment is not one belonging to the home base station;
   wherein the method further comprises:
   configuring the random access preamble for detecting an interference user in the home base station and other base stations covering the home base station, and prestoring in the other base stations identification of the home base station within a covering area of other base stations;
   and when the user equipment is in a data connected state, the determining whether the user equipment is one belonging to the home base station by the home base station according to the related information transmitted by the user equipment via the random access procedure comprises:
   receiving by the home base station the random access preamble transmitted by the user equipment, the random access preamble being that allocated to the user equipment by a base station to which the user equipment belongs according to an identification and quality and strength of a signal of an neighboring cell in a measurement report transmitted by the user equipment; wherein when the identification of the neighboring cell is the identification of the home base station and the quality and strength of the signal are the best, the base station to which the user equipment belongs allocates a pre-configured random access preamble for detecting the interference user to the user equipment; and
   determining that the user equipment is not one belonging to the home base station, if the random access preamble is the random access preamble for detecting the interference user.

2. The method according claim 1, wherein the identification of the home base station is identification of a closed user group pre-configured for the home base station.

3. The method according to claim 1, wherein the broadcasting the cell type information by the home base station in the cell comprises:
   transmitting the cell type information by the home base station via open access signaling; wherein the home base station semi-statically configures a transmission period of the open access signaling.

4. A home base station, wherein the home base station comprises:
   a first hardware configurator to pre-configure a cell type information of the home base station as an open cell type;
   a transmitter to broadcast the configured cell type information in the cell;
   a hardware detector to determine whether a user equipment is one belonging to the home base station according to related information transmitted by the user equipment via a random access procedure, wherein the related information includes a random access preamble; and
   a first processor to determine that the user equipment is an interference user, if the hardware detector determines that the user equipment is not one belonging to the home base station;
   a second hardware configurator to configure the random access preamble for detecting an interference user in the home base station;
   when the user equipment is in a data connected state, the hardware detector comprises:
   a receiver to receive the random access preamble transmitted by the user equipment, the random access preamble being that allocated to the user equipment by a base station to which the user equipment belongs according to an identification and quality and strength of a signal of an neighboring cell in a measurement report sent by the user equipment; wherein when the identification of the neighboring cell is the identification of the home base station and the quality and strength of the signal are the best, the base station to which the user equipment belongs allocates a pre-configured random access preamble for detecting the interference user to the user equipment; and
   a second processor to determine that the user equipment is not one belonging to the home base station, if the random access preamble received by the receiver is the random access preamble for the detecting interference user.

5. A non-transitory computer-readable medium comprising a program, wherein when the program is executed in a home base station, the program enables the computer to carry out the following:
   pre-configuring a cell type information of a home base station as an open cell type, and broadcasting the cell type information by the home base station in the cell;
   determining whether user equipment is one belonging to the home base station by the home base station according to related information transmitted by the user equipment via a random access procedure, wherein the related information includes a random access preamble; and
   determining by the home base station that the user equipment is an interference user, if the user equipment is not one belonging to the home base station;
   wherein the computer further to carry out the following:
   configuring the random access preamble for detecting an interference user in the home base station and other base stations covering the home base station, and prestoring in the other base stations identification of the home base station within a covering area of other base stations;
   and when the user equipment is in a data connected state, the determining whether the user equipment is one belonging to the home base station by the home base station according to the related information transmitted by the user equipment via the random access procedure comprises:
   receiving by the home base station the random access preamble transmitted by the user equipment, the random access preamble being that allocated to the user equipment by a base station to which the user equipment belongs according to an identification and quality and strength of a signal of an neighboring cell in a measurement report transmitted by the user equipment; wherein when the identification of the neighboring cell is the identification of the home base station and the quality and strength of the signal are the best, the base station to which the user equipment belongs allocates a pre-configured random access preamble for detecting the interference user to the user equipment; and determining that the user equipment is not one belonging to the home base station, if the random access preamble is the random access preamble for detecting the interference user.

6. A non-transitory storage medium in which a computer-readable program is stored, wherein the computer-readable program enables, when executed, the computer to carry out the following:

pre-configuring a cell type information of a home base station as an open cell type, and broadcasting the cell type information by the home base station in the cell;

determining whether user equipment is one belonging to the home base station by the home base station according to related information transmitted by the user equipment via a random access procedure, wherein the related information includes user information or a random access preamble; and determining by the home base station that the user equipment is an interference user, if the user equipment is not one belonging to the home base station;

wherein the computer further to carry out the following:

configuring the random access preamble for detecting an interference user in the home base station and other base stations covering the home base station, and prestoring in the other base stations identification of the home base station within a covering area of other base stations;

and when the user equipment is in a data connected state, the determining whether the user equipment is one belonging to the home base station by the home base station according to the related information transmitted by the user equipment via the random access procedure comprises:

receiving by the home base station the random access preamble transmitted by the user equipment, the random access preamble being that allocated to the user equipment by a base station to which the user equipment belongs according to an identification and quality and strength of a signal of an neighboring cell in a measurement report transmitted by the user equipment; wherein when the identification of the neighboring cell is the identification of the home base station and the quality and strength of the signal are the best, the base station to which the user equipment belongs allocates a pre-configured random access preamble for detecting the interference user to the user equipment; and determining that the user equipment is not one belonging to the home base station, if the random access preamble is the random access preamble for detecting the interference user.

7. A user equipment, comprising:

a receiver to receive configured cell type information broadcasted from a home base station to a cell; and a transmitter to transmit related information to the home base station via a random access procedure, the related information including a random access preamble;

wherein the home base station determines whether the user equipment is one belonging to the home base station according to the related information, and determines that the user equipment is an interference user, if it is determined that the user equipment is not one belonging to the home base station;

the random access preamble for detecting an interference user is configured in the home base station and other base stations covering the home base station, and identification of the home base station within a covering area of other base stations is prestored in the other base stations;

and when the user equipment is in a data connected state, the determining whether the user equipment is one belonging to the home base station according to the related information transmitted by the user equipment via the random access procedure comprises:

receiving by the home base station the random access preamble transmitted by the user equipment, the random access preamble being that allocated to the user equipment by a base station to which the user equipment belongs according to an identification and quality and strength of a signal of an neighboring cell in a measurement report transmitted by the user equipment; wherein when the identification of the neighboring cell is the identification of the home base station and the quality and strength of the signal are the best, the base station to which the user equipment belongs allocates a pre-configured random access preamble for detecting the interference user to the user equipment; and determining that the user equipment is not one belonging to the home base station, if the random access preamble is the random access preamble for detecting the interference user.

* * * * *